(12) United States Patent
Huang

(10) Patent No.: US 11,009,740 B2
(45) Date of Patent: May 18, 2021

(54) DISPLAY PANEL AND METHOD FOR FABRICATING DISPLAY PANEL

(71) Applicant: HKC CORPORATION LIMITED, Guangdong (CN)

(72) Inventor: Beizhou Huang, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 173 days.

(21) Appl. No.: 16/225,687

(22) PCT Filed: Nov. 8, 2018

(86) PCT No.: PCT/CN2018/114519
§ 371 (c)(1),
(2) Date: Dec. 19, 2018

(87) PCT Pub. No.: WO2020/052038
PCT Pub. Date: Mar. 19, 2020

(65) Prior Publication Data
US 2020/0081291 A1    Mar. 12, 2020

(30) Foreign Application Priority Data

Sep. 12, 2018 (CN) .......................... 201811060549.4

(51) Int. Cl.
*G02F 1/1335* (2006.01)
*G02F 1/1339* (2006.01)

(52) U.S. Cl.
CPC .... *G02F 1/133514* (2013.01); *G02F 1/13394* (2013.01); *G02F 1/133512* (2013.01); *G02F 1/13396* (2021.01); *G02F 1/13398* (2021.01)

(58) Field of Classification Search
CPC ......... G02F 1/133512; G02F 1/133514; G02F 1/133516; G02F 1/13473; G02F 1/339; G02F 1/13394
(Continued)

(56) References Cited

U.S. PATENT DOCUMENTS

| 2003/0137631 | A1 | 7/2003 | Nakayoshi et al. |
| 2005/0179853 | A1* | 8/2005 | Chen .................... G02F 1/13394 |
| | | | 349/155 |
| 2013/0301153 | A1* | 11/2013 | Chen .................... G03F 7/0035 |
| | | | 359/891 |

FOREIGN PATENT DOCUMENTS

| CN | 1779519 A | 5/2006 |
| CN | 102628973 A | 8/2012 |

(Continued)

OTHER PUBLICATIONS

Chinese Office Action, for HKC Corporation Limited, Chinese Application No. 201811060549.4, filed Sep. 12, 2018.
(Continued)

*Primary Examiner* — Marin Pichler
(74) *Attorney, Agent, or Firm* — Westbridge IP LLC

(57) ABSTRACT

A display panel, including a color filter substrate (100), and the color filter substrate (100) includes a first color resistance layer (21), a second color resistance layer (22) and a third color resistance layer (23), a portion of the first color resistance layer, a portion of the second color resistance layer and a portion of the third color resistance layer are overlapped to form a black matrix (26), and a portion of the first color resistance layer, a portion of the second color resistance layer and a portion of the third color resistance layer are overlapped to form a spacer (27).

10 Claims, 6 Drawing Sheets

(58) Field of Classification Search
USPC ......... 359/891, 887; 349/106, 108, 109, 110
See application file for complete search history.

(56) References Cited

FOREIGN PATENT DOCUMENTS

| CN | 102681068 A | 9/2012 |
|----|-------------|---------|
| CN | 102768378 A | 11/2012 |
| CN | 103605231 A | 2/2014 |
| CN | 104597656 A | 5/2015 |
| CN | 104932139 A | 9/2015 |
| CN | 105319760 A | 2/2016 |
| CN | 105652508 A | 6/2016 |
| CN | 106200105 A | 12/2016 |
| CN | 106773245 A | 5/2017 |
| CN | 107193162 A | 9/2017 |

OTHER PUBLICATIONS

International Search Report, dated May 31, 2019, for HKC Corporation Limited, International Application No. PCT/CN2018/114519, Filed Nov. 8, 2018.
Written Opinion of the International Search Authority, dated May 31, 2019, for HKC Corporation Limited, International Application No. PCT/CN2018/114519, Filed Nov. 8, 2018.

* cited by examiner

DISPLAY PANEL AND METHOD FOR FABRICATING DISPLAY PANEL

CROSS-REFERENCE TO RELATED APPLICATIONS

This application is the International Application No. PCT/CN2018/114519 for entry into US national phase with an international filing date of Nov. 8, 2018, designating US, now pending, and claims priority to Chinese Patent Application No. 201811060549.4, filed on Sep. 12, 2018, the content of which is incorporated herein by reference in its entirety.

BACKGROUND OF THE INVENTION

Field of the Invention

The present application relates to the technical field of display, and particularly to a display panel and a method for fabricating a display panel.

Description of Related Art

The liquid crystal display (LCD) is a commonly used electronic device, and is widely favored by users due to its low power consumption, small size, and light weight. The current liquid crystal display devices are mainly thin film transistor (TFT) liquid crystal displays (TFT-LCDs).

The liquid crystal display mainly includes a liquid crystal display panel and a backlight device. Among them, the liquid crystal display panel is mainly composed of a thin film transistor substrate (TFT substrate), a color filter substrate (CF substrate), and a liquid crystal layer interposed between the two substrates.

Applying a voltage between the two substrates, the TFT is turned on or turned off according to the scanning signals, and the switching of the data signals is performed. The liquid crystal molecules of the liquid crystal layer are rotated according to different data voltage signals to transmit or block the light, so as to form images corresponding to the data signals through transmitting the light provided by the backlight device.

The CF substrate of the liquid crystal display panel is provided with a plurality of spaced color resistance blocks, which respectively correspond to the opening regions of the plurality of sub-pixels, and the black matrixes (BMs) are disposed between the color resistance blocks and correspond to the non-opening regions of the sub-pixels, so as to prevent light leakage or optical crosstalk of the sub-pixels of different colors. The pillar spacers are disposed on the common electrode layer and are arranged in accordance with the black matrixes for supporting the thickness of the cell, wherein the pillarar spacers are further divided into primary spacers and secondary spacers, the primary spacers are supported between the two substrates, and the secondary spacers further support the thickness of the cell when the liquid crystal panel is pressed to compress the primary spacer. Whether the CF substrate is formed by overlapping strip-shaped photoresist bands and black matrixes, or by overlapping island-shaped photoresist blocks and black matrix, the fabrication process of the CF substrate includes seven processes: BM, red/green/blue resistance layer, common electrodes, primary spacers and secondary spacers. The number of processes is large and the processes are complex, and corrosion is involved in each process, thereby causing waste of raw materials and high cost.

Given the above description, there is a need to provide a CF substrate and a method for fabricating the CF substrate, which are capable of saving processes.

BRIEF SUMMARY OF THE APPLICATION

The purpose of the present application is to provide a display panel, which includes, but is not limited to, solving the problems that the process for a color filter substrate in a display panel is complex and the cost is high.

In order to solve the above problems, the technical solutions adopted by embodiments of the present application are that: a display panel, including:

a color filter substrate, and the color filter substrate includes: a substrate base layer, and the substrate base layer includes a first color resistance region, a second color resistance region and a third color resistance region respectively corresponding to open regions of a plurality of sub-pixels, and a fourth region corresponding to non-opening region of the plurality of sub-pixels; and a color resistance composite layer, and the color resistance composite layer is disposed on the substrate base layer and includes a first color resistance layer, a second color resistance layer and a third color resistance layer; wherein the first color resistance layer includes a first color resistance block disposed at least in the first color resistance region, a first color resistance film disposed in the fourth region and a first color resistance pillar disposed in the fourth region, the second color resistance layer includes a second color resistance block disposed at least in the second color resistance region, the second color resistance film disposed in the fourth region and the second color resistance pillar disposed in the fourth region, and the third color resistance layer includes a third color resistance block disposed at least in the third color resistance region, a third color resistance film disposed in the fourth region and a third color resistance pillar disposed in the fourth region; wherein the first color resistance film, the second color resistance film and the third color resistance film respectively disposed in the fourth region are overlapped to form a black matrix, and at least two of the first color resistance pillar, the second color resistance pillar and the third color resistance pillar respectively disposed in the fourth region are overlapped to form a spacer.

Another purpose of the present application is to provide a display panel, including a color filter substrate, and the color filter substrate includes: a substrate base layer, and the substrate base layer includes a first color resistance region, a second color resistance region and a third color resistance region respectively corresponding to open regions of a plurality of sub-pixels, and a fourth region corresponding to non-opening region of the plurality of sub-pixels; and a color resistance composite layer, and the color resistance composite layer is disposed on the substrate base layer and includes a first color resistance layer, a second color resistance layer and a third color resistance layer; wherein the first color resistance layer includes a first color resistance block disposed in the first color resistance region, a first color resistance film disposed in the fourth region and a first color resistance pillar disposed in the fourth region, the second color resistance layer includes a second color resistance block disposed in the second color resistance region, the second color resistance film disposed in the fourth region and the second color resistance pillar disposed in the fourth region, and the third color resistance layer includes a third color resistance block disposed in the third color resistance region, a third color resistance film disposed in the fourth region and a third color resistance pillar disposed in the fourth region; wherein the first color resistance pillar includes a first primary color resistance pillar portion and a first secondary color resistance pillar portion, the second color resistance pillar includes a second primary color resistance pillar portion and a second secondary color resistance pillar portion, and the third color resistance pillar includes a third primary color resistance pillar portion and a third secondary color resistance pillar portion; wherein the first color resistance film, the second color resistance film and the third color resistance film respectively disposed in the fourth region are overlapped to form a black matrix; the first primary color resistance pillar portion, the second primary color resistance pillar portion and the third primary color resistance pillar portion are overlapped to form a primary spacer, and the first secondary color resistance pillar portion, the second secondary color resistance pillar portion and the third secondary color resistance pillar portion are overlapped to form a secondary spacer; wherein the first color resistance block, the second color resistance block and the third color resistance block have a height of 2 µm; the first color resistance film, the second color resistance film and the third color resistance film have a height of 0.33 µm; the first primary color resistance pillar portion, the second primary color resistance pillar portion and the third primary color resistance pillar portion have a height of 1.83 µm; and the first secondary color resistance pillar portion, the second secondary color resistance pillar portion and the third secondary color resistance pillar portion have a height of 1.75 µm.

Another purpose of the present application is to provide a method for fabricating a display panel, including a step of fabricating a color filter substrate, and the step of fabricating the color filter substrate includes:

providing a substrate base layer, wherein the substrate base layer comprises a first color resistance region, a second color resistance region and a third color resistance region respectively corresponding to open regions of a plurality of sub-pixels, and a fourth region corresponding to non-opening region of the plurality of sub-pixels;

depositing first color resistance material on the substrate base layer, and obtaining a first color resistance layer after exposing, developing, and etching through a halftone mask, wherein the first color resistance layer includes a first color resistance block disposed at least in the first color resistance region, a first color resistance film disposed in the fourth region and a first color resistance pillar disposed in the fourth region;

wherein the height of the first color resistance pillar is greater than the height of the first color resistance film;

depositing second color resistance material on the substrate base layer and the first color resistance layer, and obtaining a second color resistance layer after exposing, developing, and etching through the halftone mask, wherein the second color resistance layer includes a second color resistance block disposed at least in the second color resistance region, a second color resistance film disposed in the fourth region 14 and a second color resistance pillar disposed in the fourth region;

wherein the height of the second color resistance pillar is greater than the height of the second color resistance film;

depositing third color resistance material on the substrate base layer, the first color resistance layer and the second color resistance layer, and obtaining a third color resistance layer after exposing, developing, and etching through the halftone mask, wherein the third color resistance layer includes a third color resistance block disposed at least in the third color resistance region, a third color resistance film disposed in the fourth region and a third color resistance pillar disposed in the fourth region;

wherein the height of the third color resistance pillar is greater than the height of the third color resistance film;

wherein the first color resistance film, the second color resistance film and the third color resistance film respectively disposed in the fourth region are overlapped to form a black matrix, and at least two of the first color resistance pillar, the second color resistance pillar and the third color resistance pillar respectively disposed in the fourth region are overlapped to form a spacer.

In the display panel provided by embodiments of the present application, the substrate base layer of the color filter substrate is provided with the color resistance composite layer, and the first color resistance layer includes the first color resistance block, the first color resistance film and the first color resistance pillar, the second color resistance layer includes the second color resistance block, the second color resistance film and the second color resistance pillar, and the third color resistance layer includes the third color resistance block, the third color resistance film and the third color resistance pillar. The first color resistance film, the second color resistance film and the third color resistance film are overlapped to form the black matrix, and at least two of the first color resistance pillar, the second color resistance pillar and the third color resistance pillar are overlapped to form the spacer. The spacer and the black matrix are formed simultaneously with the first color resistance block, the second color resistance block and the third color resistance block, thus the process for the black matrix and the process for the spacer are omitted, which reduces the raw material cost and production cost. Moreover, in the method for fabricating a display panel, at least two of the first color resistance pillar, the second color resistance pillar and the third color resistance pillar are overlapped to form the spacer, and the spacer and the black matrix are formed simultaneously with the first color resistance block, the second color resistance block and the third color resistance block, thus the process for the black matrix and the process for the spacer are omitted, which saves the process quantity and process complexity, and reduces the raw material cost and production cost.

BRIEF DESCRIPTION OF THE DRAWINGS

In order to more clearly illustrate the technical solutions in the embodiments of the present application, the drawings used in the description of the embodiments or the prior art will be briefly described below. Obviously, the drawings in the following description are only some embodiments of the present application, and other drawings may be obtained based on these drawings for those ordinaries skilled in the art without any creative work.

DESCRIPTION OF THE EMBODIMENTS

Figure 1:
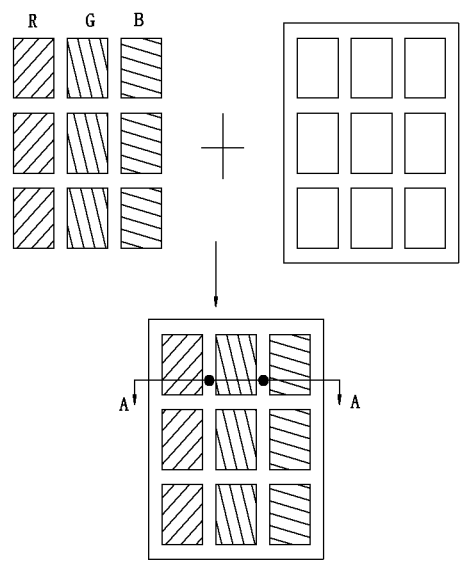
FIG. 1 is a schematic view of the display panel provided by the first embodiment of the present application, in which the island-shaped photoresist blocks and the black matrixes are overlapped.
Figure 2:
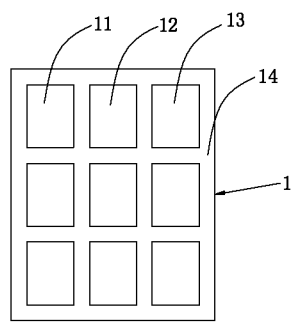
FIG. 2 is a structural schematic view of the substrate base layer of the color filter substrate of the display panel provided by the first embodiment of the present application.
Figure 3:
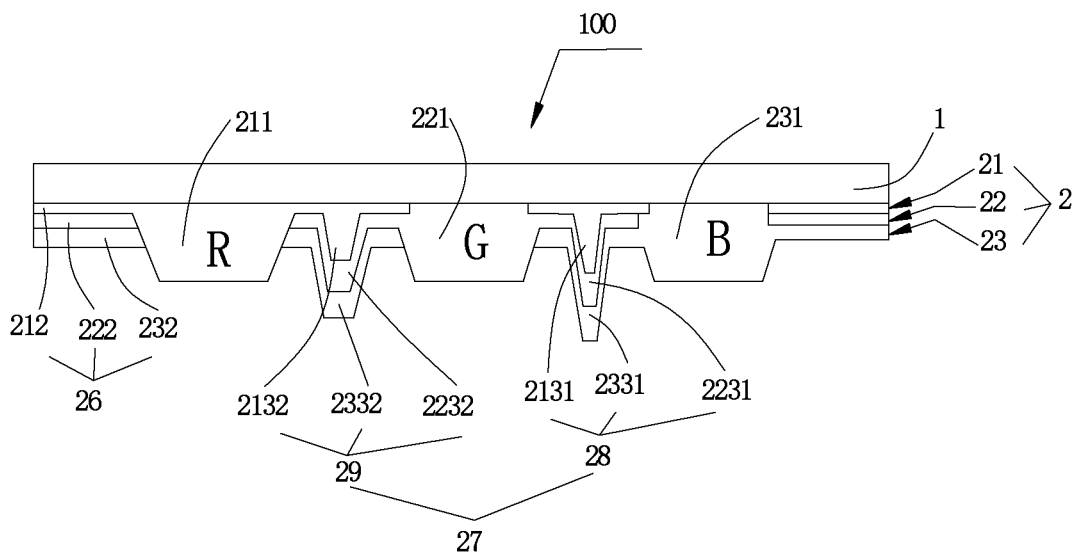
FIG. 3 and FIG. 4 is a schematic view of the section structure of the color filter substrate, along the A-A line, of the display panel provided by the first embodiment of the present application.
Figure 4:
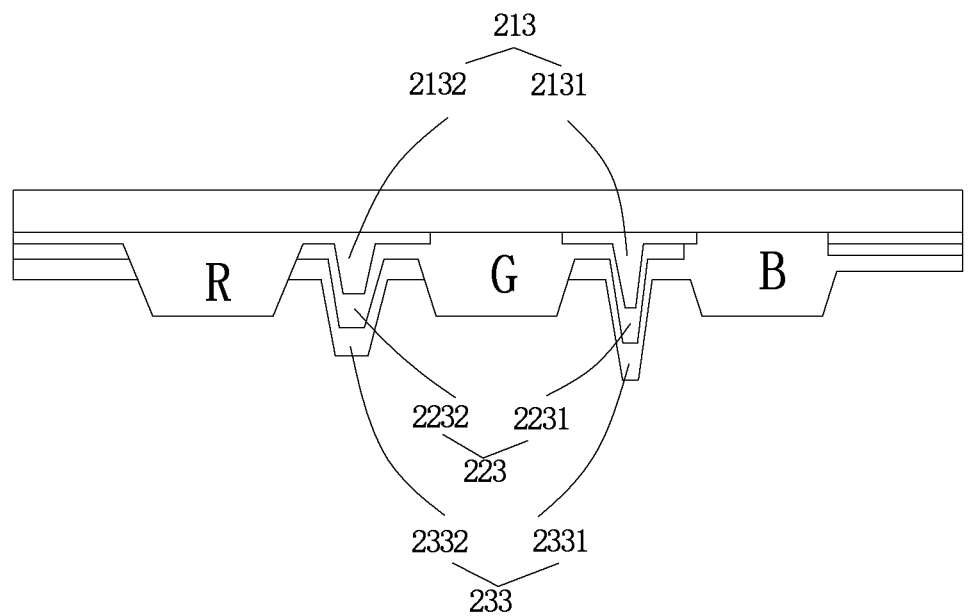

In order to make the purpose, the technical solutions and the advantages of the present application more clear, the present application will be further described in detail below with reference to the accompanying drawings and embodiments. It is understood that the specific embodiments described herein are merely illustrative of the present application and are not intended to be limit the present application.

It should be noted that, when a component is referred to as "being fixed to" or "being arranged to" another component, the component may be directly or indirectly on another component. When a component is referred to as "being connected to" another component, the component may be directly or indirectly connected to another component. The orientation or position relationship of the terms such as "upper", "lower", "left", "right", etc., are based on the orientation or position relationship as shown in the drawings, and are merely for convenience of description, rather than indicating or implying that the indicated device or component must have a specific orientation, be constructed and operated in a specific orientation, and thus are not to be construed as limiting the present invention. For those skilled in the art, the specific meaning of the above terms may be understood based on specific situations. The terms "first" and "second" are merely used for convenience of description and are not to be understood as indicating or implying a relative importance or implicitly indicating the number of technical features. "A plurality of" means two or more, unless specifically defined otherwise.

In order to illustrate the technical solutions of the present application, the details will be described below with reference to the specific drawings and embodiments.

Please refer to FIGS. 1-6, the present application provides a display panel, which includes a color filter substrate 100 and an array substrate (not shown) arranged opposite to the color filter substrate 100, and the color filter substrate 100 includes a substrate base layer 1 and a color resistance composite layer 2 disposed on the substrate base layer 1. The substrate base layer 1 includes a first color resistance region 11, a second color resistance region 12 and a third color resistance region 13 respectively corresponding to open regions of a plurality of sub-pixels, and a fourth region 14 corresponding to non-opening regions of the plurality of sub-pixels. The color resistance composite layer 2 includes a first color resistance layer 21, a second color resistance layer 22 and a third color resistance layer 23. The first color resistance layer 21 includes a first color resistance block 211 disposed at least in the first color resistance region 11, a first color resistance film 212 disposed in the fourth region 14 and a first color resistance pillar 213 disposed in the fourth region 14. Similarly, the second color resistance layer 22 includes a second color resistance block 221 disposed at least in the second color resistance region 12, a second color resistance film 222 disposed in the fourth region 14 and a second color resistance pillar 223 disposed in the fourth region 14; the third color resistance layer 23 includes a first color resistance block 211 disposed at least in the third color resistance region 13, a third color resistance film 232 disposed in the fourth region 14 and a third color resistance pillar 233 disposed in the fourth region 14. Herein, the height R0 of the first color resistance block 211 is greater than the height R2 of the first color resistance pillar 213, the height R2 of the first color resistance pillar 213 is greater than the height R1 of the first color resistance film 212; the height G0 of the second color resistance block 221 is greater than the height G2 of the second color resistance pillar 223, and the height G2 of the second color resistance pillar 223 is greater than the height G1 of the second color resistance film 222; the height B0 of the third color resistance block 231 is greater than the height B2 of the third color resistance pillar 233, and the height B2 of the third color resistance pillar 233 is greater than the height B1 of the third color resistance film 232. The first color resistance film 212, the second color resistance film 222 and the third color resistance film 232 respectively disposed in the fourth region 14 are overlapped to form a black matrix 26, and at least two of the first color resistance pillar 213, the second color resistance pillar 223 and the third color resistance pillar 233 respectively disposed in the fourth region 14 are overlapped to form a spacer 27 for supporting the array substrate in the display panel so as to maintain the cell thickness.

In the color filter substrate 100 of the display panel provided by the present application, the color resistance composite layer 2 includes the first color resistance layer 21, the second color resistance layer 22 and the third color resistance layer 23. The first color resistance layer 21 includes the first color resistance block 211 disposed at least in the first color resistance region 11, the first color resistance film 212 disposed in the fourth region 14 and the first color resistance pillar 213 disposed in the fourth region 14. Similarly, the second color resistance layer 22 includes the second color resistance block 221 disposed at least in the second color resistance region 12, the second color resistance film 222 disposed in the fourth region 14 and the second color resistance pillar 223 disposed in the fourth region 14; the third color resistance layer 23 includes the third color resistance block 231 disposed at least in the third color resistance region 13, the third color resistance film 232 disposed in the fourth region 14 and a third color resistance pillar 233 disposed in the fourth region 14. The first color resistance film 212, the second color resistance film 222 and the third color resistance film 232 respectively disposed in the fourth region 14 are overlapped to form the black matrix 26, and at least two of the first color resistance pillar 213, the second color resistance pillar 223 and the third color resistance pillar 233 respectively disposed in the fourth region 14 are overlapped to form the spacer 27. The black matrix 26 and the spacer 27 are formed simultaneously with the first color resistance block 211, the second color resistance block 221 and the third color resistance block 231, thus the separate process for the black matrix 26 and the spacer 27 is omitted, which avoids the waste of the raw material of the black matrix 26 and the raw material of the spacer 27 during processes, and reduces the raw material cost and production cost.

In the first embodiment and the second embodiment of the present application, the first color resistance layer 21 is a red resistance layer, the second color resistance layer 22 is a green resistance layer, and the third color resistance layer 23 is a blue resistance layer. In other embodiments, the colors of the first color resistance layer 21, the second color resistance layer 22 and the third color resistance layer 23 may be exchanged arbitrarily without any restriction.

Please refer to FIGS. 1-4, in the color filter substrate 100 of the display panel provided by the first embodiment of the present application, the first color resistance block 211, the second color resistance block 221 and the third color resistance block 231 are all island-shaped. The first color resistance block 211 is disposed corresponding to the first color resistance region 11 of the substrate base layer 1, the second color resistance block 221 is disposed corresponding to the second color resistance region 12, and the third color resistance block 231 is disposed corresponding to the third color resistance region 13. The first color resistance block 211, the second color resistance block 221, and the third color resistance block 231 respectively correspond to the open regions of the red, green, and blue sub-pixels, acting as red, green, and blue filters respectively.

In the fourth region 14 of the substrate base layer 1, the first color resistance film 212, the second color resistance film 222, and the third color resistance film 232 respectively absorb the red light, green light, and blue light, which are capable of blocking the passage of the light, thereby the first color resistance film 212, the second color resistance film 222, and the third color resistance film 232 may act as the black matrix 26 when overlapped, and the black matrix 26 surrounds around the first color resistance block 211, the second color resistance block 221, and the third color resistance block 231, and corresponds to the non-opening regions of the sub-pixels.

In the first embodiment of the present application, the height R0 of the first color resistance block 211 is greater than the height R2 of the first color resistance pillar 213 but is less than three times of the height R2 of the first color resistance pillar 213; the height G0 of the second color resistance block 221 is greater than the height G2 of the second color resistance pillar 223 but is less than three times of the height G2 of the second color resistance pillar 223; and the height B0 of the third color resistance block 231 is greater than the height B2 of the third color resistance pillar 233 but is less than three times of the height B2 of the third color resistance pillar 233.

Specifically, the ranges of the height R0 of the first color resistance block 211, the height G0 of the second color resistance block 221 and the height B0 of the third color resistance block 231 are 2±0.5 µm, alternatively, R0=G0=B0. The ranges of the height R1 of the first color resistance film 212, the height G1 of the second color resistance film 222 and the height B1 of the third color resistance film 232 are 0.33±0.2 µm, alternatively, R1=G1=B1=0.33 µm.

In an embodiment, the first color resistance pillar 213 includes a first primary color resistance pillar portion 2131 and a first secondary color resistance pillar portion 2132. The height R21 of the first primary color resistance pillar portion 2131 is greater than the height R22 of the first secondary resistance pillar portion, and the first primary color resistance pillar portion 2131 and the first secondary color resistance pillar portion 2132 are spaced from each other through the first color resistance block 211 or the second color resistance block 221 or the third color resistance block 231. For example, the first primary color resistance pillar portion 2131 is disposed between the second color resistance block 221 and the third color resistance block 231, and the first secondary color resistance pillar portion 2132 is disposed between the first color resistance block 211 and the second color resistance block 221.

In other embodiments, the positions of the first primary color resistance pillar portion 2131 and the first secondary color resistance pillar portion 2132 may be changed, for example, the first primary color resistance pillar portion 2131 is disposed between the adjacent two third color resistance blocks 231, and the first secondary color resistance pillar portion 2132 is disposed between the two second color resistance blocks 221, which is not limited herein.

The second color resistance pillar 223 includes a second primary color resistance pillar portion 2231 disposed on the first primary color resistance pillar portion 2131 and a second secondary color resistance pillar portion 2232 disposed on the first secondary color resistance pillar portion 2132, and the height G21 of the second primary color resistance pillar portion 2231 is greater than the height G22 of the second secondary color resistance pillar portion 2232. The third color resistance pillar 233 includes a third primary color resistance pillar portion 2331 disposed on the second primary color resistance pillar portion and a third secondary color resistance pillar portion 2332 disposed on the secondary color resistance pillar portion 2232, and the height B21 of the third primary color resistance pillar portion 2331 is greater than the height B22 of the third secondary color resistance pillar portion 2332.

The first primary color resistance pillar portion 2131, the second primary color resistance pillar portion 2231 and the third primary color resistance pillar portion 2331 are overlapped to form the primary spacer 28 disposed between the second color resistance block 221 and the third color resistance block 231, and the height H1 of the primary spacer 28 is H1=R21+G21+B21. The first secondary color resistance pillar portion 2132, the second secondary color resistance pillar portion 2232 and the third secondary color resistance pillar portion 2332 are overlapped to form the secondary spacer 29 disposed between the first color resistance block 211 and the second color resistance block 221, and the height H2 of the secondary spacer 29 is H2=R22+G22+B22, and the height of the secondary spacer 29 is less than the height of the primary spacer 28.

The height R21 of the first primary color resistance pillar portion 2131, the height G21 of the second primary color resistance pillar portion 2231 and the height B21 of the third primary color resistance pillar portion 2331 are in the range of 1.83±0.05 μm, alternatively, R21=G21=B21=1.83 μm.

The height R22 of the first secondary color resistance pillar portion 2131, the height G22 of the second secondary color resistance pillar portion 2232 and the height B22 of the third secondary color resistance pillar portion 2331 are in the range of 1.75±0.05 μm. Alternatively, R22=G22=B22=1.75 μm.

Figure 5:
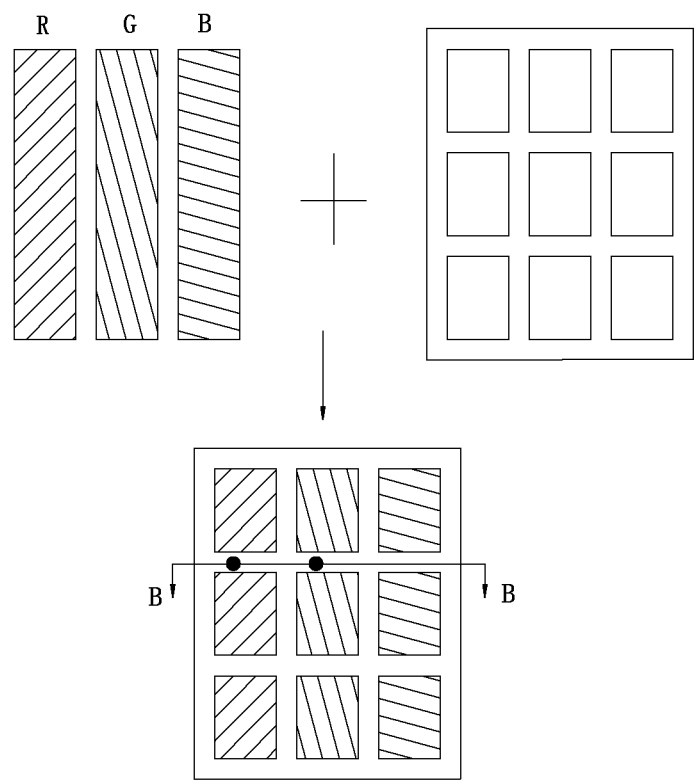
FIG. 5 is a schematic view of the display panel provided by the second embodiment of the present application, in which the string-shaped photoresist bands and the black matrixes are overlapped.
Figure 6:
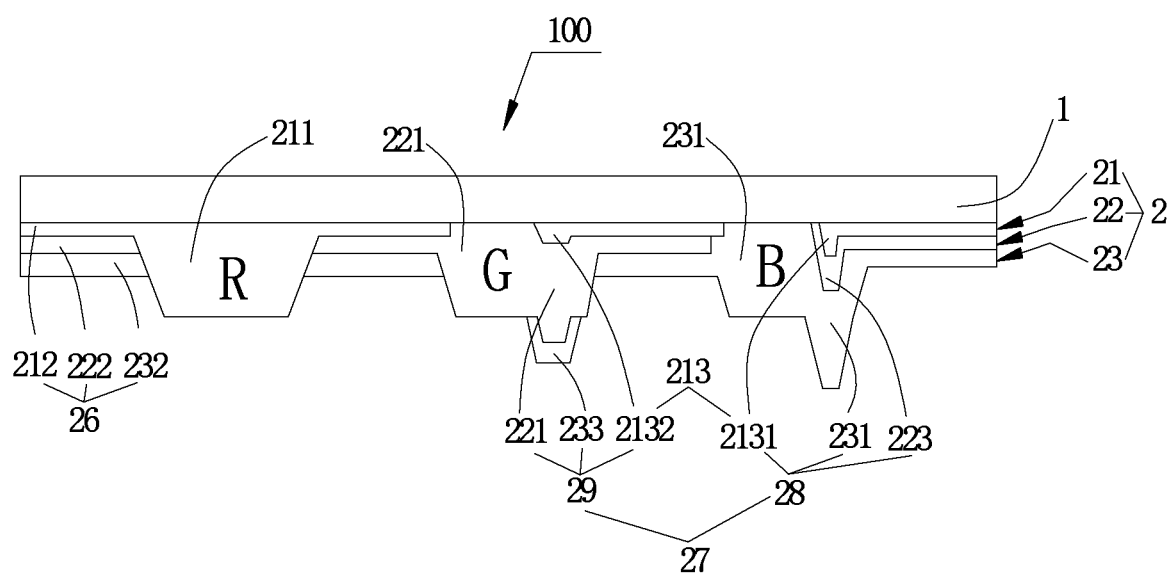
FIG. 6 is a schematic view of the section structure of the color filter substrate, along the B-B line, of the display panel provided by the second embodiment of the present application.

Please refer to FIGS. 5-6, in the color filter substrate 100 of the display panel provided by the second embodiment of the present application, the first color resistance block 211, the second color resistance block 221 and the third color resistance block 231 are strip-shaped. The first color resistance block 211 is disposed in accordance with the plurality of the first color resistance regions 11 and a portion of the fourth region 14 between adjacent two of the first color resistance regions 11, the second color resistance block 221 is disposed in accordance with the plurality of the second color resistance regions 12 and a portion of the fourth region 14 between adjacent two of the second color resistance regions 12, and the third color resistance block 231 is disposed in accordance with the plurality of the third color resistance regions 13 and a portion of the fourth region 14 between adjacent two of the third color resistance regions 13.

The portion of the first color resistance block 211 corresponding to the plurality of the first color resistance regions 11 corresponds to the opening regions of the red sub-pixels, acting as a red filter; the portion of the second color resistance block 221 corresponding to the plurality of the second color resistance regions 12 corresponds to the opening regions of the green sub-pixels, acting as a green filter; the portion of the third color resistance block 231 corresponding to the plurality of the third color resistance regions 13 corresponds to the opening regions of the blue sub-pixels, acting as a blue filter.

Similarly, in the fourth region 14 of the substrate base layer 1, the first color resistance film 212, the second color resistance film 222, and the third color resistance film 232 respectively absorb the red light, green light, and blue light, which are eventually capable of blocking the transmitting of the light, thereby the first color resistance film 212, the second color resistance film 222, and the third color resistance film 232 may act as the black matrix 26 when overlapped, and correspond to the non-opening regions of the sub-pixels.

Figure 8:
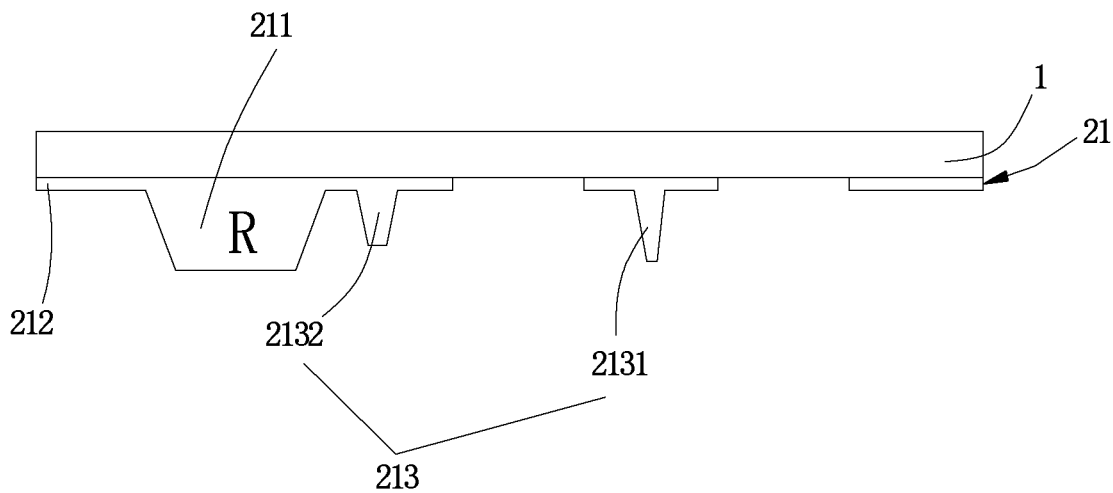
FIG. 8 is a schematic view of the step S2 of the method for fabricating the color filter substrate of the display panel provided by the third embodiment of the present application.

In the second embodiment, as shown in FIG. 8, the first color resistance pillar 213, the second color resistance pillar 223 and the third color resistance pillar 233 are disposed between two of the first color resistance regions 11, or two of the second color resistance regions 12, or two of the third color resistance regions 13. The purpose of this arrangement lies in that the spacer 27 may be formed by thickness of the first color resistance block 211 disposed between two of the first color resistance regions 11, the second color resistance block 221 disposed between two of the second color resistance regions 12, and the third color resistance block 231 disposed between two of the third color resistance regions 13, which saves a part of the color resistance material and reduces the production cost. In other embodiments, in the fourth region 14 of the substrate base layer 1, the first color resistance pillar 213, the second color resistance pillar 223 and the third color resistance pillar 233 may all be disposed on the strips between the first color resistance block 211, the second color resistance block 221 and the third color resistance block 231, at this time, the formation of the spacer 27 is the same as that in the first embodiment, and details of which will be not described herein again.

As shown in FIG. 6, the spacer 27 in the second embodiment is formed by overlapping the color resistance pillars with two colors on the color resistance block with another color.

Specifically, the first color resistance pillar 213 includes a first primary color resistance pillar portion 2131 and a first secondary color resistance pillar portion 2132. The height R21 of the first primary color resistance pillar portion 2131 is greater than the height R22 of the first secondary resistance pillar portion 2132, the first primary color resistance pillar portion 2131 is disposed between adjacent two of the third color resistance regions 13, and the first secondary color resistance pillar portion 2132 is disposed between adjacent two of the second color resistance regions 12; the second color resistance pillar 223 is disposed on the first primary color resistance pillar portion 2131, and the height G2 of second color resistance pillar 223 is equal to the height R21 of the first primary color resistance pillar portion 2131; and the third color resistance pillar 233 is disposed on the second color resistance block 221 of the second color resistance regions 12, and the height B2 of the third color resistance pillar 233 is equal to the height R22 of the first secondary color resistance pillar portion 2132.

In the second embodiment, the third color resistance block 231, the first primary color resistance pillar portion 2131 and the second color resistance pillar 223 are overlapped to form the primary spacer 28 disposed between adjacent two of the third color resistance regions 13, and the height H1 of the primary spacer 28 is H1=B0+R21+G2. The second color resistance block 221, the first secondary color resistance pillar portion 2132 and the third color resistance pillar 233 are overlapped to form the secondary spacer 29 disposed between adjacent two of the second color resistance regions 12, and the height H2 of the secondary spacer 29 is H2=G0+R22+B2. Specifically, the ranges of the height R0 of the first color resistance block 211, the height G0 of the second color resistance block 221 and the height B0 of the third color resistance block 231 are 2±0.5 μm, alternatively, R0=G0=B0. The ranges of the height R1 of the first color resistance film 212, the height G1 of the second color resistance film 222 and the height B1 of the third color resistance film 232 are 0.33±0.2 μm, alternatively, R1=G1=B1=0.33 μm.

The height R21 of the first primary color resistance pillar portion 2131 and the height G2 of the second color resistance pillar 223 are in the range of 1.83±0.05 μm, alternatively, R21=G2=1.83 μm.

The height R22 of the first secondary color resistance pillar portion 2131 and the height B2 of the third color resistance pillar 233 are in the range of 1.75±0.05 μm. Alternatively, R22=G2=1.75 μm.

Figure 7:
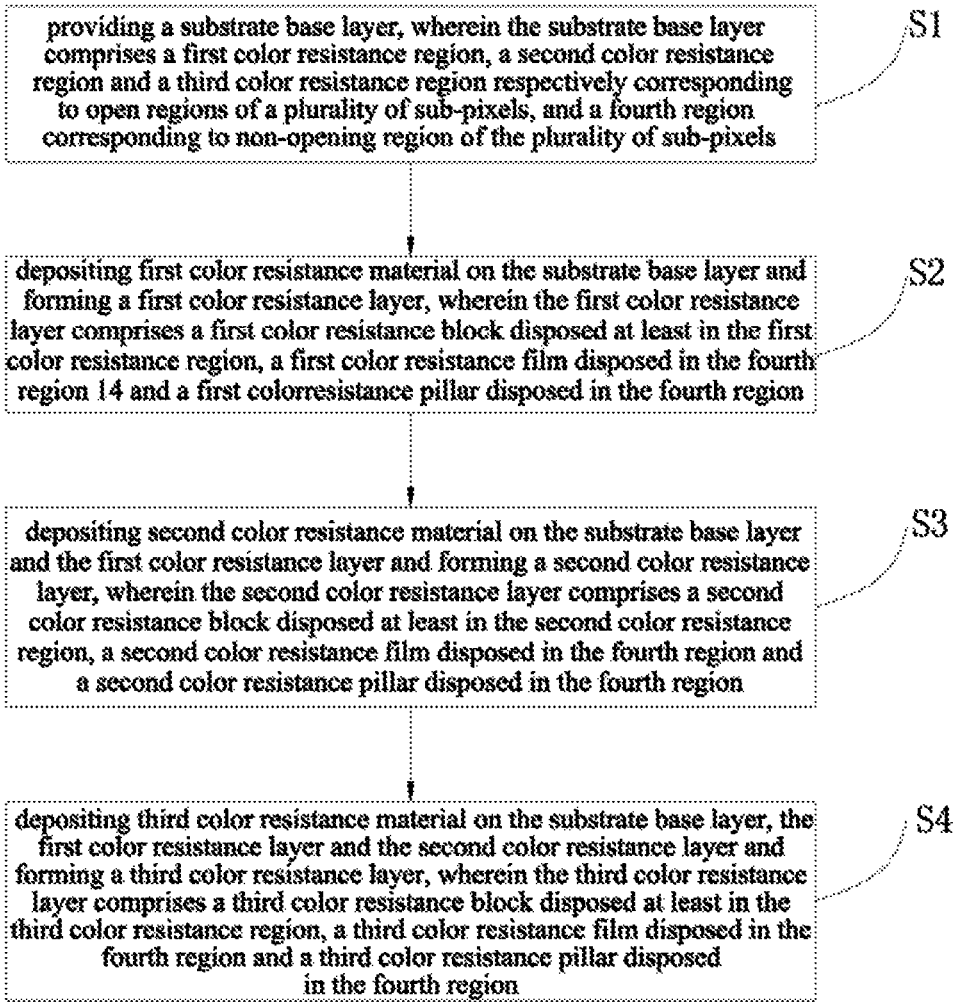
FIG. 7 is a flow chart of the method for fabricating the color filter substrate of the display panel provided by the third embodiment and the fourth embodiment of the present application.

Please refer to FIG. 7, the present application further provides a method for fabricating a display panel, which includes the step of fabricating a color filter substrate, the step of fabricating an array substrate, and the step of aligning the color filter substrate with the array substrate, wherein the step of fabricating the color filter substrate includes:

step S1, providing a substrate base layer 1, which includes a first color resistance region 11, a second color resistance region 12 and a third color resistance region 13 respectively corresponding to open regions of a plurality of sub-pixels, and a fourth region 14 corresponding to non-opening regions of the plurality of sub-pixels;

step S2, depositing a layer of first color resistance material, such as red color resistance material, on the substrate base layer 1, and obtaining a first color resistance layer 21 after exposing, developing, and etching through a halftone mask, wherein the first color resistance layer 21 includes a first color resistance block 211 disposed at least in the first color resistance region 11, a first color resistance film 212 disposed in the fourth region 14 and a first color resistance pillar 213 disposed in the fourth region 14; the height R0 of the first color resistance block 211 is greater than the height R2 of the first color resistance pillar 213, and the height R2 of the first color resistance pillar 213 is greater than the height R1 of the first color resistance film 212;

step S3, depositing a layer of second color resistance material, such as green color resistance material, on the substrate base layer 1 and the first color resistance layer 21, and obtaining a second color resistance layer 22 after exposing, developing, and etching through the halftone mask, wherein the second color resistance layer 22 includes a second color resistance block 221 disposed at least in the second color resistance region 12, a second color resistance film 222 disposed in the fourth region 14 and a second color resistance pillar 223 disposed in the fourth region 14;

the height B0 of the second color resistance block 221 is greater than the height B2 of the second color resistance pillar 223, and the height B2 of the second color resistance pillar 223 is greater than the height B1 of the second color resistance film 222;

step S4, depositing a layer of third color resistance material, such as blue color resistance material, on the substrate base layer 1, the first color resistance layer 21 and the second color resistance layer 22, and obtaining a third color resistance layer 23 after exposing, developing, and etching through the halftone mask, wherein the third color resistance layer 23 includes a third color resistance block 231 disposed at least in the third color resistance region 13, a third color resistance film 232 disposed in the fourth region 14 and a third color resistance pillar 233 disposed in the fourth region 14;

the height B0 of the third color resistance block 231 is greater than the height B2 of the third color resistance pillar 233, and the height B2 of the third color resistance pillar 233 is greater than the height B1 of the third color resistance film 232;

the first color resistance film 212, the second color resistance film 222 and the third color resistance film 232 respectively disposed in the fourth region 14 are overlapped to form the black matrix 26, and at least two of the first color resistance pillar 213, the second color resistance pillar 223 and the third color resistance pillar 233 respectively disposed in the fourth region 14 are overlapped.

In other embodiments, the colors of the first color resistance layer 21, the second color resistance layer 22 and the third color resistance layer 23 may be exchanged arbitrarily without any restriction.

Figure 9:
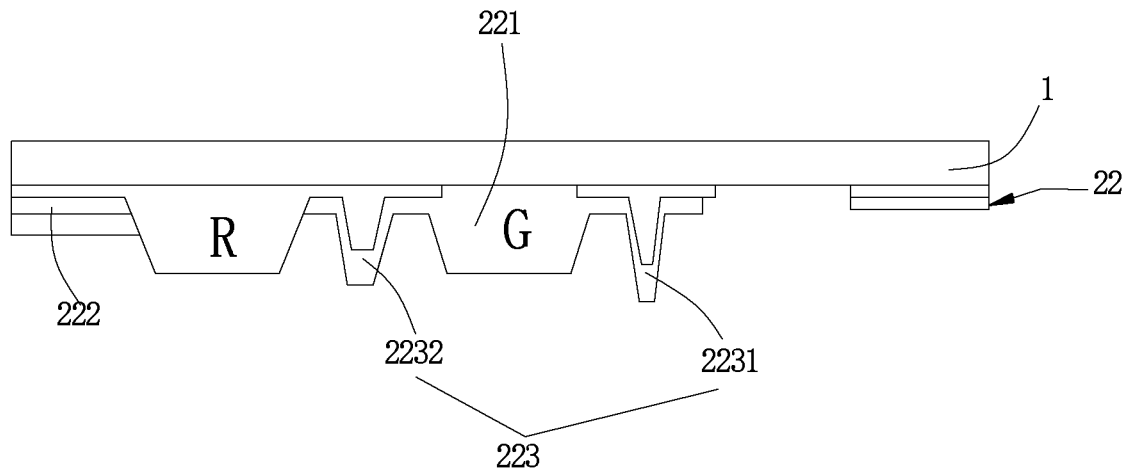
FIG. 9 is a schematic view of the step S3 of the method for fabricating the color filter substrate of the display panel provided by the third embodiment of the present application.
Figure 10:
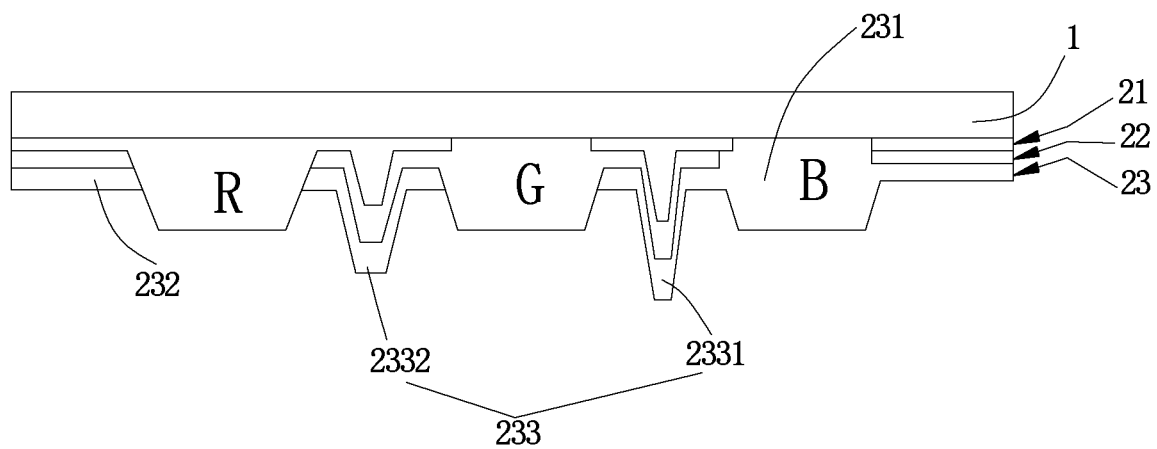
FIG. 10 is a schematic view of the step S4 of the method for fabricating the color filter substrate of the display panel provided by the third embodiment of the present application.

Specifically, please refer to the third embodiment as shown in FIGS. 8-10.

In the step S2 as shown in FIG. 8, the first color resistance block 211 is island-shaped, and is arranged in accordance with the first color resistance region 11. In the fourth region 14 of the substrate base layer 1, the first color resistance film 212 and the second color resistance pillar 223 are formed, wherein the first color resistance pillar 213 is divided into a first primary color resistance pillar portion 2131 and a first secondary color resistance pillar portion 2132. The height R21 of the first primary color resistance pillar portion 2131 is greater than the height R22 of the first secondary resistance pillar portion 2132, and the first primary color resistance pillar portion 2131 and the first secondary color resistance pillar portion 2132 are spaced from each other. For example, in the third embodiment, the first primary color resistance pillar portion 2131 is disposed between the second color resistance region 12 and the third color resistance region 13, and the first secondary color resistance pillar portion 2132 is disposed between the first color resistance region 11 and the second color resistance region 12.

Of course, in other embodiments, the positions of the first primary color resistance pillar portion 2131 and the first secondary color resistance pillar portion 2132 may be changed, for example, the first primary color resistance pillar portion 2131 is disposed between adjacent two of the third color resistance regions 13, and the first secondary color resistance pillar portion 2132 is disposed between two of the second color resistance regions 12, which is not limited herein.

In the step S3 as shown in FIG. 9, the second color resistance block 221 is island-shaped, and is arranged in accordance with the second color resistance region 12. In the fourth region 14 of the substrate base layer 1, the second color resistance film 222 and the second color resistance pillar 223 are formed, wherein the second color resistance film 222 covers the second color resistance film 222, and the second color resistance pillar 223 includes a second primary color resistance pillar portion 2231 disposed on the first primary color resistance pillar portion 2131 and a second secondary color resistance pillar portion 2232 disposed on the first secondary color resistance pillar portion 2132. The height G21 of the second primary color resistance pillar portion 2231 is greater than the height G22 of the second secondary color resistance pillar portion 2232.

In the step S4 as shown in FIG. 10, the third color resistance block 231 is island-shaped, and is arranged in accordance with the third color resistance region 13. In the fourth region 14 of the substrate base layer 1, the third color resistance film 232 and the third color resistance pillar 233 are formed, wherein the third color resistance film 232 covers the second color resistance film 222, and the third color resistance pillar 233 includes a third primary color resistance pillar portion 2331 disposed on the second primary color resistance pillar portion 2231 and a third secondary color resistance pillar portion 2332 disposed on the second secondary color resistance pillar portion 2232. The height B21 of the third primary color resistance pillar portion 2331 is greater than the height B22 of the third secondary color resistance pillar portion 2332.

The first color resistance block 211, the second color resistance block 221, and the third color resistance block 231 respectively correspond to the open regions of the red, green, and blue sub-pixels, acting as red, green, and blue filters respectively.

Figure 11:
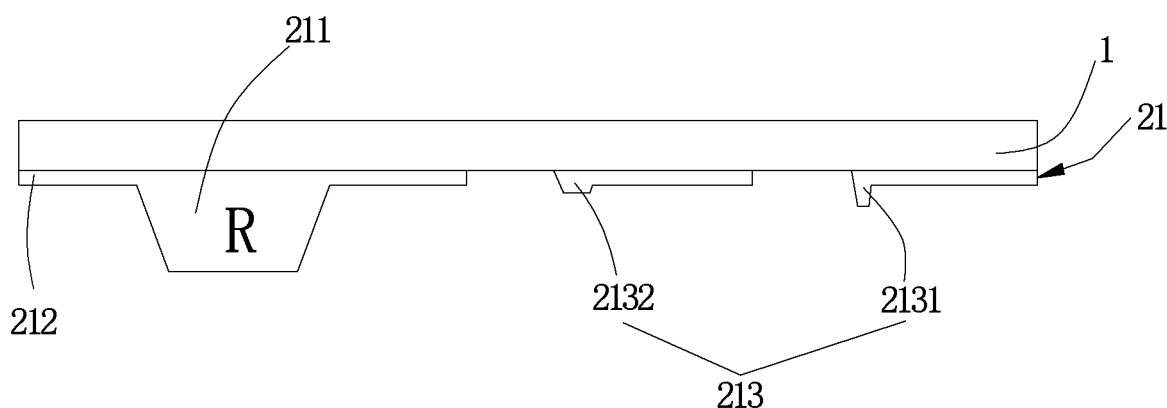
FIG. 11 is a schematic view of the step S2 of the method for fabricating the color filter substrate of the display panel provided by the fourth embodiment of the present application.
Figure 12:
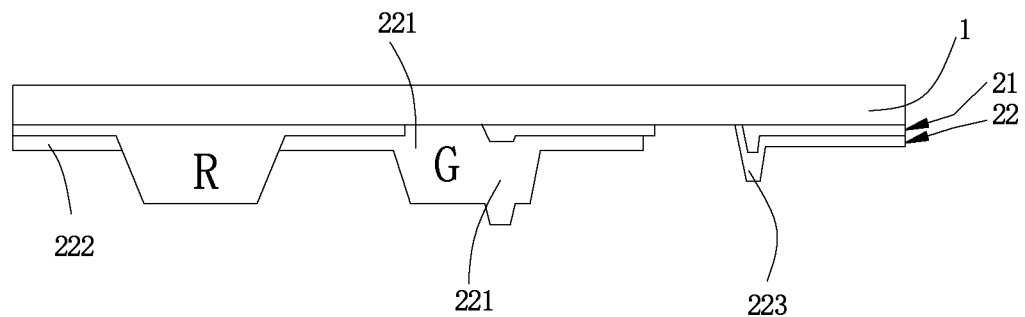
FIG. 12 is a schematic view of the step S3 of the method for fabricating the color filter substrate of the display panel provided by the fourth embodiment of the present application.
Figure 13:
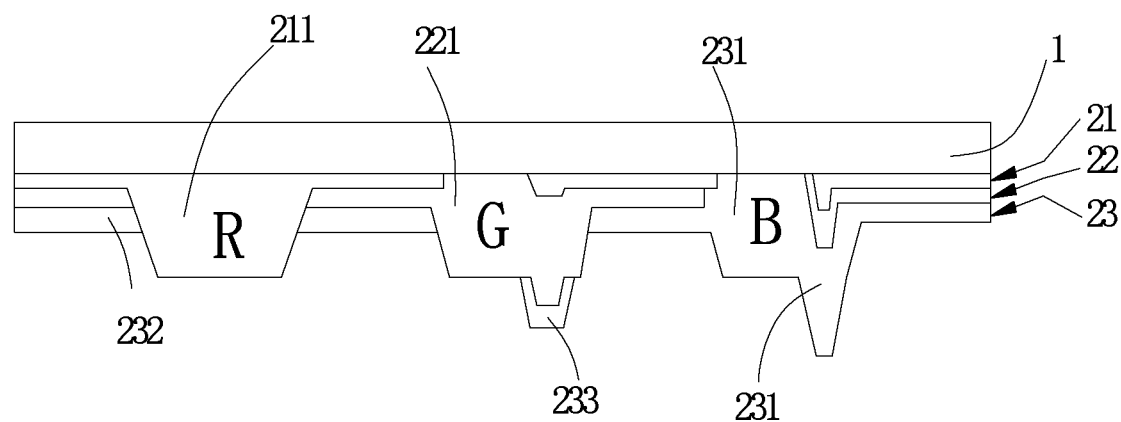
FIG. 13 is a schematic view of the step S4 of the method for fabricating the color filter substrate of the display panel provided by the fourth embodiment of the present application.

Please refer to FIGS. 11-13, the step of fabricating the color filter substrate in the method for fabricating the display panel provided by the fourth embodiment of the present application is shown.

At the step S2 as shown in FIG. 11, the first color resistance block 211 is strip-shaped, and the first color resistance block 211 is disposed in accordance with the plurality of first color resistance regions 11 and a portion of the fourth region 14 between two of the first color resistance regions 11. The portion of the first color resistance block 211 corresponding to the plurality of first color resistance regions 11 is configured to correspond to the opening regions of the red sub-pixels, acting as a red filter.

Meanwhile, the first color resistance film 212 and the first color resistance pillar 213 are formed in the fourth region 14 of the substrate base layer 1. The first color resistance pillar 213 includes the first primary color resistance pillar portion 2131 and the first secondary color resistance pillar portion 2132, wherein, the first primary color resistance pillar portion 2131 is disposed between two of the third color resistance regions 13, the first secondary color resistance pillar portion 2132 is disposed between two of the second color resistance regions 12, and the height R21 of the first primary color resistance pillar portion 2131 is greater than the height R22 of the first secondary color resistance pillar portion 2132.

At the step S3 as shown in FIG. 12, the second color resistance block 221 is strip-shaped, and the second color resistance block 211 is disposed in accordance with the plurality of second color resistance regions 12 and a portion of the fourth region 14 between two of the second color resistance regions 12. The portion of the second color resistance block 221 corresponding to the plurality of second color resistance regions 12 is configured to correspond to the opening regions of the green sub-pixels, acting as a green filter. The portion of the second color resistance block 221 disposed between two of the second color resistance regions 12 further covers the first secondary color resistance pillar portion 2132.

Meanwhile, the second color resistance film 222 and the second color resistance pillar 223 are formed in the fourth region 14 of the substrate base layer 1, wherein the second color resistance film 222 covers the first color resistance film 212, and the second color resistance pillar 223 covers the first primary color resistance pillar portion 2131, and the height G2 of the second color resistance pillar 223 may be equal to the height R21 of the first primary color resistance pillar portion 2131. The thickness of the second color resistance block 221 is uniform, and thus the region corresponding to the first secondary color resistance pillar portion 2132 has a height greater than the height of other region of the second color resistance block 221.

At the step S4 as shown in FIG. 13, the third color resistance block 231 is strip-shaped, and the third color resistance block 231 is disposed in accordance with the plurality of third color resistance regions 13 and a portion of the fourth region 14 between two of the third color resistance regions 13. The portion of the third color resistance block 231 corresponding to the plurality of third color resistance regions 13 is configured to correspond to the opening regions of the blue sub-pixels, acting as a blue filter. The portion of the third color resistance block 231 disposed between two of the third color resistance regions 13 further covers the second color resistance pillar 223.

Similarly, the third color resistance film 232 and the third color resistance pillar 233 are formed in the fourth region 14 of the substrate base layer 1, wherein the third color resistance film 233 covers the second color resistance film 222, the third color resistance pillar 233 covers the second color resistance block 221 and the first secondary color resistance pillar portion 2232, and the height B2 of the third color resistance block 233 may be equal to the height R22 of the first secondary color resistance pillar portion 2132. For the same reason, the thickness of the third color resistance block 231 is uniform, and thus the region corresponding to the first primary color resistance pillar portion 2131 and the second color resistance pillar 223 has a height greater than the height of other region of the third color resistance block 231.

The above description is merely alternative embodiments of the present application, and is not intended to limit the present application. For those skilled in the art, the present application may have various variations and modifications. Any modification, equivalent substitution and improvement made within the spirit and principle of the present application should be included in the scope of claims of the present application.

What is claimed is:

1. A display panel, comprising a color filter substrate, wherein the color filter substrate comprises:
a substrate base layer, comprising a first color resistance region, a second color resistance region and a third color resistance region respectively corresponding to open regions of a plurality of sub-pixels, and a fourth region corresponding to non-opening region of the plurality of sub-pixels; and a color resistance composite layer, disposed on the substrate base layer, and comprising a first color resistance layer, a second color resistance layer and a third color resistance layer;
wherein the first color resistance layer comprises a first color resistance block disposed at least in the first color resistance region, a first color resistance film disposed in the fourth region and a first color resistance pillar disposed in the fourth region; the second color resistance layer comprises a second color resistance block disposed at least in the second color resistance region, a second color resistance film disposed in the fourth region and a second color resistance pillar disposed in the fourth region;
the third color resistance layer comprises a third color resistance block disposed at least in the third color resistance region, a third color resistance film disposed in the fourth region and a third color resistance pillar disposed in the fourth region;
wherein the first color resistance film, the second color resistance film and the third color resistance film respectively disposed in the fourth region are overlapped to form a black matrix, and at least two of the first color resistance pillar, the second color resistance pillar and the third color resistance pillar respectively disposed in the fourth region are overlapped to form a spacers wherein a height of the first color resistance block is greater than a height of the first color resistance pillar, and a height of the first color resistance pillar is greater than a height of the first color resistance film;
wherein the first color resistance block, the second color resistance block and the third color resistance block are all string-shaped; the first color resistance block is disposed in accordance with the first color resistance region and a portion of the fourth region between two of the first color resistance blocks, the second color resistance block is disposed in accordance with the second color resistance region and a portion of the fourth region between two of the second color resistance blocks, and the third color resistance block is disposed in accordance with the third color resistance region a portion of the fourth region between two of the third color resistance blocks;
wherein the first color resistance pillar, the second color resistance pillar and the third color resistance pillar respectively disposed in the fourth region are overlapped to form the spacer;
wherein the first color resistance pillar comprises a first primary color resistance pillar portion and a first secondary color resistance pillar portion, and the height of the first primary color resistance pillar portion is greater than the height of the first secondary color resistance pillar portion;
the second color resistance pillar comprises a second primary color resistance pillar portion and a second secondary color resistance pillar portion, and the height of the second primary color resistance pillar portion is greater than the height of the second secondary color resistance pillar portion; and the third color resistance pillar comprises a third primary color resistance pillar portion and a third secondary color resistance pillar portion, and the height of the third primary color resistance pillar portion is greater than the height of the third secondary color resistance pillar portion;

wherein the first primary color resistance pillar portion, the second primary color resistance pillar portion and the third primary color resistance pillar portion are overlapped to form a primary spacer, and the first secondary color resistance pillar portion, the second secondary color resistance pillar portion and the third secondary color resistance pillar portion are overlapped to form a secondary spacer.

2. The display panel according to claim 1, wherein, the height of the first color resistance block is 2±0.5 µm, the height of the second color resistance block is 2±0.5 µm, and the height of the third color resistance block is 2±0.5 µm; and the height of the first color resistance film is 0.33±0.2 µm, the height of the second color resistance film is 0.33±0.2 µm, and the height of the third color resistance film is 0.33±0.2 µm.

3. The display panel according to claim 1, wherein, the first primary color resistance pillar portion and the first secondary color resistance pillar portion are spaced from each other through the first color resistance block, the second color resistance block or the third color resistance block.

4. The display panel according to claim 3, wherein, the first primary color resistance pillar portion is disposed between the second color resistance block and the third color resistance block, and the first secondary color resistance pillar portion is disposed between the first color resistance block and the second color resistance block.

5. The display panel according to claim 3, wherein, the first primary color resistance pillar portion is disposed between adjacent two of the third color resistance blocks, and the first secondary color resistance pillar portion is disposed between adjacent two of the second color resistance blocks.

6. The display panel according to claim 1, wherein, two of the first color resistance pillar, the second color resistance pillar and the third color resistance pillar are overlapped with a portion of one, having different color, of the first color resistance block, the second color resistance block and the third color resistance block disposed in the fourth region, so as to form the spacer.

7. The display panel according to claim 6, wherein, the first color resistance pillar comprises the first primary color resistance pillar portion and the first secondary color resistance pillar portion, wherein the height of the first primary color resistance pillar portion is greater than the height of the first secondary color resistance pillar portion; the height of the second color resistance pillar is equal to the height of the first primary color resistance pillar portion; and the height of the third color resistance pillar is equal to the height of the first secondary color resistance pillar portion;

wherein the second color resistance block, the first secondary color resistance pillar and the third color resistance pillar are overlapped to form the primary spacer, and the third color resistance block, the first primary color resistance pillar portion and the second color resistance pillar are overlapped to form the secondary spacer.

8. The display panel according to claim 7, wherein, the first primary color resistance pillar portion is disposed between adjacent two of the third color resistance regions, and the first secondary color resistance pillar portion is disposed between adjacent two of the second color resistance regions; the second color resistance pillar is disposed on the first primary color resistance pillar portion, and the third color resistance pillar is disposed on the second color resistance block of the second color resistance region.

9. A display panel, comprising a color filter substrate, wherein the color filter substrate comprises:

a substrate base layer, comprising a first color resistance region, a second color resistance region and a third color resistance region respectively corresponding to open regions of a plurality of sub-pixels, and a fourth region corresponding to non-opening region of the plurality of sub-pixels; and a color resistance composite layer, disposed on the substrate base layer, and comprising a first color resistance layer, a second color resistance layer and a third color resistance layer;

wherein the first color resistance layer comprises a first color resistance block disposed in the first color resistance region, a first color resistance film disposed in the fourth region and a first color resistance pillar disposed in the fourth region; the second color resistance layer comprises a second color resistance block disposed in the second color resistance region, the second color resistance film disposed in the fourth region and the second color resistance pillar disposed in the fourth region; the third color resistance layer comprises a third color resistance block disposed in the third color resistance region, a third color resistance film disposed in the fourth region and a third color resistance pillar disposed in the fourth region;

wherein the first color resistance pillar comprises a first primary color resistance pillar portion and a first secondary color resistance pillar portion, the second color resistance pillar comprises a second primary color resistance pillar portion and a second secondary color resistance pillar portion, and the third color resistance pillar comprises a third primary color resistance pillar portion and a third secondary color resistance pillar portion;

wherein the first color resistance film, the second color resistance film and the third color resistance film respectively disposed in the fourth region are overlapped to form a black matrix; the first primary color resistance pillar portion, the second primary color resistance pillar portion and the third primary color resistance pillar portion are overlapped to form a primary spacer, and the first secondary color resistance pillar portion, the second secondary color resistance pillar portion and the third secondary color resistance pillar portion are overlapped to form a secondary spacer;

wherein a height of the first color resistance block is greater than a height of the first color resistance pillar, and a height of the first color resistance pillar is greater than a height of the first color resistance film;

wherein the first color resistance block, the second color resistance block and the third color resistance block are all string-shaped; the first color resistance block is disposed in accordance with the first color resistance region and a portion of the fourth region between two of the first color resistance blocks, the second color resistance block is disposed in accordance with the second color resistance region and a portion of the fourth region between two of the second color resistance blocks, and the third color resistance block is disposed in accordance with the third color resistance region a portion of the fourth region between two of the third color resistance blocks;

wherein the first color resistance pillar, the second color resistance pillar and the third color resistance pillar respectively disposed in the fourth region are overlapped to form the spacer;

wherein the first color resistance pillar comprises a first primary color resistance pillar portion and a first secondary color resistance pillar portion, and the height of the first primary color resistance pillar portion is greater than the height of the first secondary color resistance pillar portion;

the second color resistance pillar comprises a second primary color resistance pillar portion and a second secondary color resistance pillar portion, and the height of the second primary color resistance pillar portion is greater than the height of the second secondary color resistance pillar portion; and the third color resistance pillar comprises a third primary color resistance pillar portion and a third secondary color resistance pillar portion, and the height of the third primary color resistance pillar portion is greater than the height of the third secondary color resistance pillar portion;

wherein the first primary color resistance pillar portion, the second primary color resistance pillar portion and the third primary color resistance pillar portion are overlapped to form a primary spacer, and the first secondary color resistance pillar portion, the second secondary color resistance pillar portion and the third secondary color resistance pillar portion are overlapped to form a secondary spacer.

10. A method for fabricating a display panel, comprising a step of fabricating a color filter substrate, wherein the step of fabricating the color filter substrate comprises:

providing a substrate base layer, wherein the substrate base layer comprises a first color resistance region, a second color resistance region and a third color resistance region respectively corresponding to open regions of a plurality of sub-pixels, and a fourth region corresponding to non-opening region of the plurality of sub-pixels;

forming a first color resistance layer on the substrate base layer, wherein the first color resistance layer comprises a first color resistance block disposed at least in the first color resistance region, a first color resistance film disposed in the fourth region and a first color resistance pillar disposed in the fourth region, and the height of the first color resistance pillar is greater than the height of the first color resistance film;

forming a second color resistance layer on the substrate base layer and the first color resistance layer, wherein the second color resistance layer comprises a second color resistance block disposed at least in the second color resistance region, a second color resistance film disposed in the fourth region and a second color resistance pillar disposed in the fourth region, and the height of the second color resistance pillar is greater than the height of the second color resistance film; and forming a third color resistance layer on the substrate base layer, the first color resistance layer and the second color resistance layer, wherein the third color resistance layer comprises a third color resistance block disposed at least in the third color resistance region, a third color resistance film disposed in the fourth region and a third color resistance pillar disposed in the fourth region, and the height of the third color resistance pillar is greater than the height of the third color resistance film;

wherein, the first color resistance film, the second color resistance film and the third color resistance film respectively disposed in the fourth region are overlapped to form a black matrix, and at least two of the first color resistance pillar, the second color resistance pillar and the third color resistance pillar respectively disposed in the fourth region are overlapped to form a spacer;

wherein a height of the first color resistance block is greater than a height of the first color resistance pillar, and a height of the first color resistance pillar is greater than a height of the first color resistance film;

wherein the first color resistance block, the second color resistance block and the third color resistance block are all string-shaped; the first color resistance block is disposed in accordance with the first color resistance region and a portion of the fourth region between two of the first color resistance blocks, the second color resistance block is disposed in accordance with the second color resistance region and a portion of the fourth region between two of the second color resistance blocks, and the third color resistance block is disposed in accordance with the third color resistance region a portion of the fourth region between two of the third color resistance blocks;

wherein the first color resistance pillar, the second color resistance pillar and the third color resistance pillar respectively disposed in the fourth region are overlapped to form the spacer;

wherein the first color resistance pillar comprises a first primary color resistance pillar portion and a first secondary color resistance pillar portion, and the height of the first primary color resistance pillar portion is greater than the height of the first secondary color resistance pillar portion;

the second color resistance pillar comprises a second primary color resistance pillar portion and a second secondary color resistance pillar portion, and the height of the second primary color resistance pillar portion is greater than the height of the second secondary color resistance pillar portion; and the third color resistance pillar comprises a third primary color resistance pillar portion and a third secondary color resistance pillar portion, and the height of the third primary color resistance pillar portion is greater than the height of the third secondary color resistance pillar portion;

wherein the first primary color resistance pillar portion, the second primary color resistance pillar portion and the third primary color resistance pillar portion are overlapped to form a primary spacer, and the first secondary color resistance pillar portion, the second secondary color resistance pillar portion and the third secondary color resistance pillar portion are overlapped to form a secondary spacer.

* * * * *